US012338759B1

(12) United States Patent
Khadiya (10) Patent No.: US 12,338,759 B1
(45) Date of Patent: Jun. 24, 2025

(54) AFTERTREATMENT SYSTEM FOR WORK VEHICLE ENGINE SYSTEM AND ENGINE SYSTEM USING SAME

(71) Applicant: Deere & Company, Moline, IL (US)

(72) Inventor: Navin Khadiya, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/581,665

(22) Filed: Feb. 20, 2024

(51) Int. Cl.
*F01N 3/20* (2006.01)
*E02F 9/20* (2006.01)
(Continued)

(52) U.S. Cl.
CPC ............ *F01N 3/208* (2013.01); *E02F 9/2066* (2013.01); *F01N 3/206* (2013.01); *F01N 3/2066* (2013.01);
(Continued)

(58) Field of Classification Search
CPC combination set(s) only.
See application file for complete search history.

(56) References Cited

U.S. PATENT DOCUMENTS

| | | |
|---|---|---|
| 5,211,011 A | 5/1993 | Nishikawa et al. |
| 6,244,046 B1 | 6/2001 | Yamashita |

(Continued)

FOREIGN PATENT DOCUMENTS

| | | |
|---|---|---|
| DE | 10045548 B4 | 8/2010 |
| EP | 1662107 B1 | 4/2007 |
| JP | 3800016 B2 | 7/2006 |

OTHER PUBLICATIONS

Dubbe et al. "Hysteresis Phenomena on Pt- and Pd-Diesel Oxidation Catalysts: Experimental Observations", Springer Science+Business Media New York 2016, Topics in Catalysis (2016) 59:1054-1058, DOI 10.1007/s11244-016-0589-8, published May 9, 2016 (6 pages).
(Continued)

*Primary Examiner* — Binh Q Tran
(74) *Attorney, Agent, or Firm* — KLINTWORTH & ROZENBLAT IP LLP (57) ABSTRACT

A control system for a work vehicle engine system with an engine from which exhaust gas flows, at least in part, to an aftertreatment selective catalytic reduction (SCR) catalyst includes a temperature sensor providing an indication of a catalyst temperature associated with the SCR catalyst and a controller having processing and memory architecture. The controller is configured to receive a control signal from the temperature sensor indicative of the catalyst temperature and execute instructions according to the control signal to activate a conversion of exhaust gas by the SCR catalyst by operating the engine system in a first mode that drives the SCR catalyst temperature to a first temperature threshold. After first temperature threshold is reached, the controller is configured to execute instructions to reduce power to the SCR catalyst by operating the engine system in a second mode in which the conversion of the exhaust gas by the SCR catalyst is sustained by hysteresis within a temperature band between the first temperature threshold and a second temperature threshold that is less than the first temperature threshold.

20 Claims, 8 Drawing Sheets

(51) Int. Cl.
   *F01N 9/00*    (2006.01)
   *F01N 11/00*   (2006.01)
   *F02D 41/02*   (2006.01)

(52) U.S. Cl.
   CPC ............ *F01N 9/005* (2013.01); *F01N 11/005* (2013.01); *F01N 2900/04* (2013.01); *F01N 2900/1404* (2013.01); *F01N 2900/1602* (2013.01); *F01N 2900/1626* (2013.01); *F02D 41/024* (2013.01); *F02D 2200/0802* (2013.01)

(56) References Cited

U.S. PATENT DOCUMENTS

| | | |
|---|---|---|
| 11,846,257 B2 | 12/2023 | Haaland |
| 2013/0305695 A1* | 11/2013 | Henry ..................... F01N 3/103 60/287 |
| 2017/0145938 A1* | 5/2017 | Kothandaraman ..... F02D 41/26 |
| 2020/0248607 A1* | 8/2020 | Joo ......................... F01N 3/021 |
| 2020/0291838 A1* | 9/2020 | Lambert ............... F02D 41/405 |
| 2021/0372310 A1* | 12/2021 | Bare ....................... F01N 3/103 |
| 2023/0105573 A1* | 4/2023 | Schmidt ............. F01N 13/0093 60/286 |
| 2023/0311846 A1* | 10/2023 | Jin ........................ F01N 3/2013 701/99 |

OTHER PUBLICATIONS

Soubaihi et al. "Critical Review of Low-Temperature CO Oxidation and Hysteresis Phenomenon on Heterogeneous Catalysts", MDPI Catalysts Aug. 2018, 660; doi: 10.3390/catal8120660, published Dec. 14, 2018 (19 pages).

* cited by examiner

AFTERTREATMENT SYSTEM FOR WORK VEHICLE ENGINE SYSTEM AND ENGINE SYSTEM USING SAME

STATEMENT OF FEDERALLY SPONSORED RESEARCH OR DEVELOPMENT

Not applicable.

FIELD OF THE DISCLOSURE

This disclosure generally relates to internal combustion engine systems and an aftertreatment system for an internal combustion engine.

BACKGROUND OF THE DISCLOSURE

Heavy-duty work vehicles, such as those used in the agricultural, construction, forestry, and mining industries, may utilize various propulsion systems and drive trains to provide tractive power to the ground-engaging wheels or tracks for travel and work operations of the work vehicle. Internal combustion engines, including various compression ignition engines (such as diesel engines), combust fuel to generate power for tractive and work operations of these work vehicles. Combustion of fuel generates harmful gases that are converted by an aftertreatment system into less harmful gases that can be exhausted from the work vehicle. For example, combustion of diesel fuel may generate oxides of nitrogen (NOx) and other gases that are converted by an aftertreatment system into nitrogen and water vapor. The aftertreatment system includes one or more catalyst(s) that when heated to at least a predetermined temperature facilitates such conversion as gases produced by the engine system pass through the aftertreatment system. However, fuel efficiency of the engine may be compromised if the engine is operated to generate sufficient power for both the work operation of the work vehicle and to maintain the catalyst(s) at the predetermined temperature or a higher temperature.

SUMMARY OF THE DISCLOSURE

The disclosure provides a control system for a work vehicle engine system with an engine from which exhaust gas flows, at least in part, to an aftertreatment selective catalytic reduction (SCR) catalyst. The control system includes a temperature sensor that provides an indication of a catalyst temperature associated with the SCR catalyst and a controller. The controller has processing and memory architecture configured to receive a control signal from the temperature sensor indicative of the catalyst temperature and execute instructions according to the control signal to activate a conversion of exhaust gas by the SCR catalyst by operating the engine system in a first mode that drives the SCR catalyst temperature to a first temperature threshold. After the SCR catalyst has reached the first temperature threshold, the controller also executes instruction that reduce power to the SCR catalyst by operating the engine system in a second mode in which the conversion of the exhaust gas by the SCR catalyst is sustained by hysteresis within a temperature band between the first temperature threshold and a second temperature threshold that is less than the first temperature threshold.

The present disclosure also provides an engine system for a work vehicle that includes an engine with at least one piston-cylinder arrangement and an exhaust manifold, an aftertreatment system in communication with the exhaust manifold and including a selective catalytic reduction (SCR) catalyst, a temperature sensor providing an indication of a catalyst temperature associated with the SCR catalyst, and a control system. The control system has processing and memory architecture configured to receive a control signal from the temperature sensor indicative of the catalyst temperature and execute instructions according to the control signal to activate a conversion of exhaust gas by the SCR catalyst by operating the engine system in a first mode that drives the SCR catalyst temperature to a first temperature threshold. In addition, the SCR catalyst has reached the first temperature threshold, the controller executes instructions to reduce power to the SCR catalyst by operating the engine system in a second mode in which the conversion of the exhaust gas by the SCR catalyst is sustained by hysteresis within a temperature band between the first temperature threshold and a second temperature threshold that is less than the first temperature threshold.

In some aspects or embodiments, the disclosure provides a control system that operates the engine system to put a first power demand on the engine during the first mode and a second power demand that is less than the first mode during the second mode. In addition, the control system may include a control valve operable to throttle flow upstream or downstream of the engine. The controller operates the control valve to a first throttle position in the first mode and to a second throttle position in the second mode and the control valve closes off more flow when in the first throttle position than in the second throttle position. In some cases, the control valve is an exhaust throttle valve which is positioned in an exhaust path between the engine and the aftertreatment SCR catalyst. In other cases, the control valve is an intake valve located upstream of an intake manifold of the engine. The control system may include an electric heater powered by the engine and the controller operates the electric heater in the first mode 9 to supplement the engine to raise the SCR catalyst to the first temperature threshold.

In other aspects or embodiments, the disclosure provides an engine control unit that controls operation of the engine. In some cases, the engine control unit controls an air-fuel mixture of the engine prior to combustion and the engine control unit effects a stoichiometric air-fuel ratio in the first mode and the engine control unit effects a lean air-fuel ratio in the second mode. Further, the engine may include a plurality of piston-cylinder arrangements and the engine control unit deactivates one or more of the plurality of piston-cylinder arrangements in the second mode of operation.

In other aspects or embodiments, the disclosure provides a control system in which the first temperature threshold corresponds to a light-off temperature at which the SCR catalyst effects a reduction reaction of nitrogen oxides and the second temperature threshold corresponds to a temperature at which the reduction reaction of nitrogen oxides is terminated. In some cases, temperature band between the first temperature threshold and the second temperature threshold in which the reduction reaction of the nitrogen oxides is sustained by hysteresis within the SCR catalyst is at least 25 degrees Celsius.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed engine system and aftertreatment control system for a work vehicle as shown in the accompanying figures of the drawings described briefly above. Various modifications to the example embodiments may be contemplated by one of skill in the art. Discussion herein focuses on the aftertreatment control system and engine system being for a work vehicle, such as an agricultural tractor, but the aftertreatment control system and engine system disclosed herein may be utilized in other contexts, including other work vehicle platforms in the agriculture, construction, forestry, mining, and other industries.

Overview

Fuel is combusted by an engine system to generate power necessary to undertake various work operations of a work vehicle such as to transport the vehicle, transport a load carried by the vehicle, operate electrical and mechanical auxiliary devices of the vehicle, such as various work implements and the like. Combustion of the fuel by the engine system results in exhaust particulates and gases such as hydrocarbons and oxides of nitrogen.

Work vehicles include aftertreatment devices that filter the exhaust particulates and break down hazardous exhaust gases generated by the engine system into more inert gases such as carbon dioxide, water vapor, and nitrogen. The aftertreatment device includes a catalyst that when activated facilitates a reduction reaction among the gases that are generated by engine system and passed through the aftertreatment device to convert hazardous components of such gases into less hazardous materials that may be emitted from the work vehicle.

Activation of the catalyst requires heating of the catalyst to at least a first temperature threshold at which catalysis necessary for the reduction reaction is activated. Such first temperature threshold is at least a temperature conventionally referred to as a "light-off" temperature of the catalyst, which is a temperature the catalyst must reach to facilitate the reduction reaction.

A hysteresis phenomenon has been observed in catalysts that after the catalyst is heated to the light-off temperature, the catalyst continues to facilitate the reduction reaction even if the temperature thereof falls below the light-off temperature. Such catalysis due to hysteresis persists until the temperature of the catalyst falls below a second temperature threshold. The light-off temperature and the second temperature threshold vary in accordance with the catalyst used in the aftertreatment device.

In some cases, the rate of reduction by the catalyst continues to increase as the catalyst is heated to a temperature greater than the light-off temperature until the catalyst reaches a further temperature at which the rate of reduction is maximized. In some embodiments, the first temperature threshold is selected to be a temperature that is at least the light-off temperature and at or below such further temperature at which the rate of reduction is maximized.

A work vehicle as described below includes an aftertreatment system controller that operates the engine system in a first mode that causes rapid heating of the catalyst until the temperature of the catalyst reaches the first temperature threshold (e.g., at least the light-off temperature) to activate the catalyst. Thereafter, the aftertreatment system controller operates in a second mode as long as the temperature of the catalyst 2 remains between the first temperature threshold and the second temperature threshold.

During the first mode, the engine system is operated to provide sufficient power necessary to operate the vehicle and/or move a load carried thereby the vehicle as directed by an operator of the vehicle and additional power needed to heat the catalyst. In some embodiments, fuel efficiency of the engine system may be sacrificed to ensure rapid heating of the catalyst when the engine system is operated in the first mode.

When operated in the second mode, the engine system is operated to provide sufficient power necessary to for the work operations of the vehicle such as transport of the work vehicle, move a load carried by the work vehicle, operate auxiliary devices (e.g., work implements) installed in the work vehicle, and the like. In some embodiments, the engine system is operated to optimize fuel efficiency when operating in the second mode.

Various ways may be used heat the catalyst more rapidly when the engine system is operated in the first mode. For example, in some embodiments, power from the engine system is used to operate a heater proximate the catalyst that provides thermal energy to rapidly heat the catalyst. In other embodiments, operation of the engine system may be adjusted when operated in the first mode to generate exhaust gases at a higher temperature than when operated in the second mode. The higher temperature of the exhaust gases facilitates rapidly heating the catalyst.

For example, the aftertreatment system controller may adjust an exhaust throttle valve disposed in the exhaust path between the engine and the aftertreatment system to reduce the flow of exhaust therethrough and thereby increase the temperature of the exhaust gas supplied to the aftertreatment system. Alternately, the aftertreatment system controller may adjust an air or recirculated exhaust intake valve located upstream of an intake manifold to reduce the flow of air or recirculated exhaust therethrough and thereby cause the engine to combust fuel at a higher temperature.

In addition, in some embodiments, the aftertreatment system controller may direct an engine control unit (ECU) to operate the engine to generate exhaust gases at a higher temperature during the first mode than in the second mode. For example, the aftertreatment system controller may direct the ECU to supply a stochiometric air-fuel mixture to the engine when the engine system is operated in the first mode and a leaner air-fuel mixture to the engine when the engine system is operated in the second mode. In addition, the aftertreatment system controller may direct the ECU to operate all of the piston-cylinder arrangements of the engine when the engine system is operated in the first mode and fewer than all of the piston-cylinder arrangements of the engine when the engine system is operated in the second mode, and thereby generate higher temperature exhaust gases when the engine system is operated in the first mode.

These and further aspects of the disclosed aftertreatment control system will be better understood with regard to the example described hereinafter.

Example Aftertreatment Control System

Figure 1:
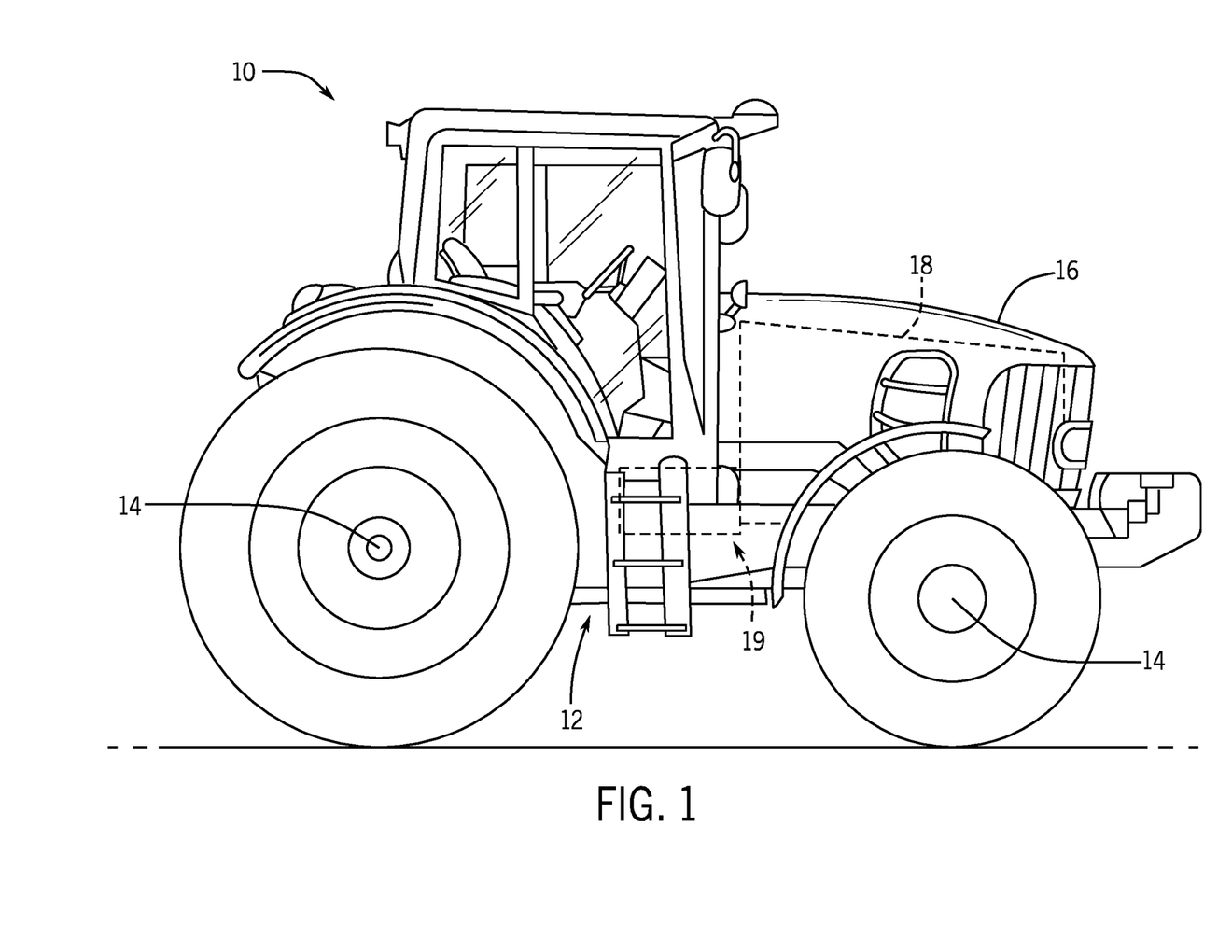
FIG. 1 is an example work vehicle in the form of an agricultural tractor in which the aftertreatment control system of the present disclosure may be incorporated.

Referring to FIG. 1, a work vehicle 10 is shown that can implement embodiments of the disclosure. In the illustrated example, the work vehicle 10 is depicted as an agricultural tractor. It will be understood, however, that other configurations may be possible, including configurations with the work vehicle 10 as a different kind of tractor, a harvester, a log skidder, a grader, or one of various other work vehicle platforms. The work vehicle 10 includes a chassis or frame 12 carried on front and rear wheels 14. Positioned on a forward end region of the chassis 12 is an engine housing 16 within which is located an engine system 18. The engine system 18 provides power via an associated powertrain 19 to an output member (e.g., an output shaft, not shown) that, in turn, transmits power to axle(s) of the work vehicle 10 to provide propulsion thereto and/or to a power take-off shaft for powering an implement on or associated with the work vehicle 10, for example.

Figure 2:
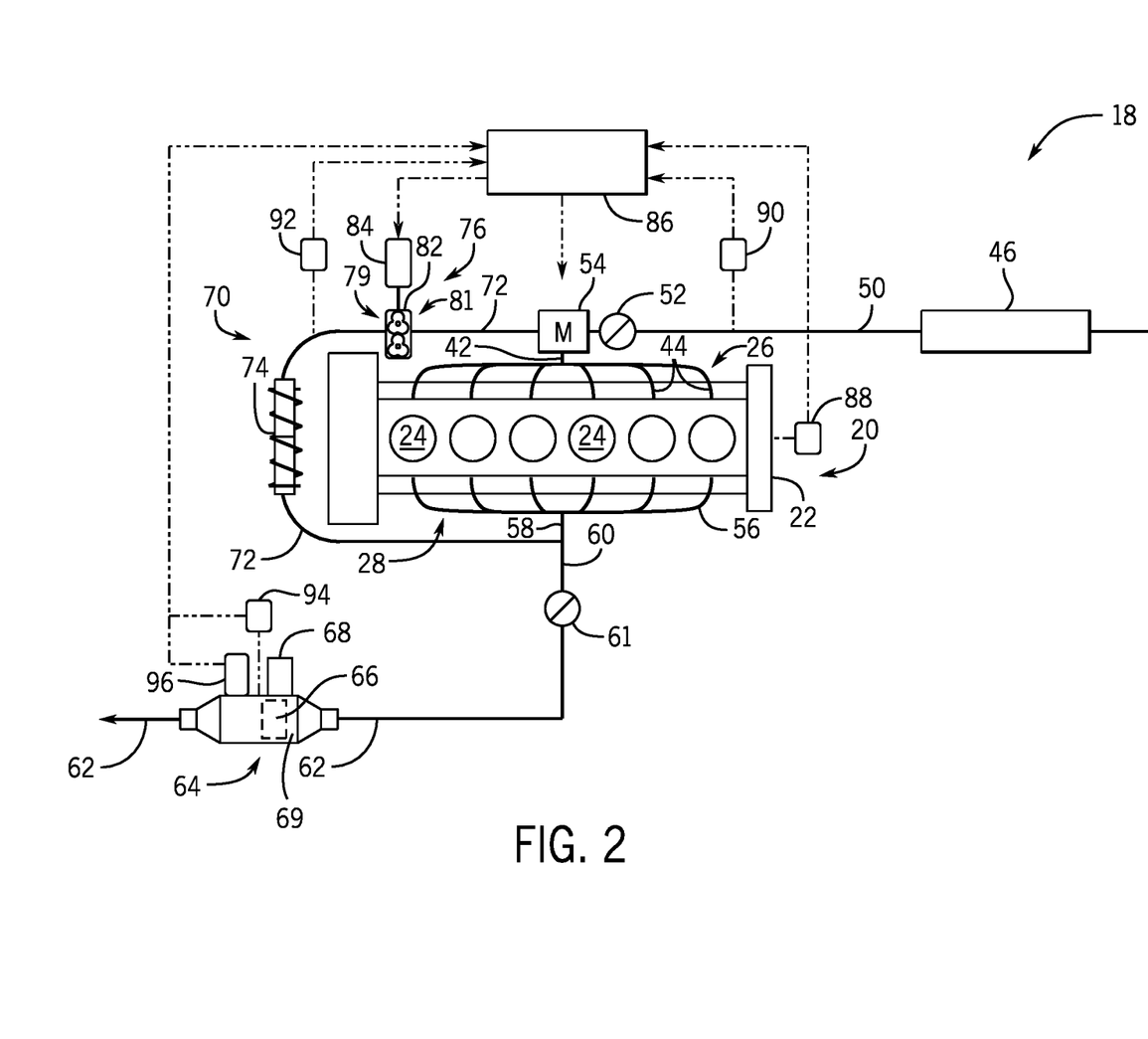
FIG. 2 is a schematic diagram of an example engine system of the work vehicle of FIG. 1.

The engine system 18 is illustrated in greater detail in FIG. 2 in accordance with an example implementation. Referring to FIG. 2, the engine system 18 includes an internal combustion engine 20 (hereafter, "engine") that, in different embodiments, may be a compression- or spark-ignition internal combustion engine. The engine 20 of the engine system 18 includes an engine block 22 having a plurality of piston-cylinder arrangements 24 that operate to cause combustion events. In the illustrated implementation, the engine 20 is an inline-6 (I-6) compression ignition (e.g., diesel) engine defining six piston-cylinder arrangements 24; however, in alternative implementations various engine styles and layouts may be used.

The engine system 18 also includes an intake manifold 26 fluidly connected to the engine 20 and an exhaust manifold 28 fluidly connected to the engine 20. The intake manifold 26 includes a main intake 42 and a plurality of secondary intakes 44 44 in fluid communication with a corresponding piston-cylinder arrangement 24 to direct a supply of air thereto.

Fresh air is drawn from the ambient environment through an air intake 46 that may include one or more intake components (e.g., an air filter, an air cooler, etc.) disposed in an air intake passageway 50 that leads to an air intake throttle valve 52 and a mixer 54, upstream from the air intake manifold 26. The air intake 48 (via an air cooler) may reduce the temperature of the intake air prior to it being provided to the engine 20 to increase the density of the intake air for improved volumetric efficiency. The air intake throttle valve 52 and the mixer 54 regulate and facilitate delivery of the air provided to the intake manifold 26.

The exhaust manifold 28 of the engine system 18 includes a plurality of secondary exhaust passages 56, each in fluid communication with a corresponding piston-cylinder arrangement 24, that direct exhaust gases generated by the engine 20 to a main outlet 58 and into an exhaust gas passageway 60. Exhaust gas produced by the engine 20 is directed out from the exhaust manifold 28, passes through the exhaust gas passageway 60, through an exhaust throttle valve 61, through an aftertreatment passageway 62, and into an aftertreatment system 64. The aftertreatment system 64 treats the exhaust gas prior to the exhaust gas being vented to the ambient environment via an exhaust outlet 65.

The aftertreatment system 64 includes a selective catalyst reduction (SCR) catalyst 66 disposed therein. In addition, the aftertreatment system 64 may include one or more additional components or devices that further treat the exhaust gas such as a diesel oxidation catalyst, a diesel particulate filtration (DPF) device, and the like.

In some embodiments, the engine system 18 includes a catalyst heater 68 (e.g., an electric heater, a fuel fired burner, etc.) that may be operated to heat the SCR catalyst 66. In some cases, the catalyst heater 68 is disposed on a metal housing 69 of the aftertreatment system 64 and operated to heat the housing 69, which in turn heats the interior of the aftertreatment system 64 (including the SCR catalyst 66) via conduction and/or convection. In other cases, the catalyst heater 68 is disposed adjacent to or in line with the aftertreatment passageway 62 and heats the exhaust gases that flow through the aftertreatment passageway 62 and into the aftertreatment system 64. The SCR catalyst 66 is thereafter heated by such heated exhaust gases. In still other cases, the catalyst heater 68 is disposed within the aftertreatment system 64 and heats the SCR catalyst 66 directly (for example, by directing thermal energy toward the catalyst). In some embodiments, the catalyst heater 68 may comprise heater elements embedded in the SCR catalyst 66 that can be activated to heat the SCR catalyst 66.

An exhaust gas recirculation (EGR) system 70 is further provided in the engine system 18 that functions to recirculate a portion of the exhaust gas generated by the engine 20 and thereby reduce the formation of NOx during combustion. Exhaust gas is drawn from the exhaust manifold 28 and recirculated into the intake manifold 26 via the EGR system 70. The EGR system 70 includes an EGR passageway 72, an EGR cooler 74, and an EGR pump 76. The EGR passageway 72 draws in a portion of the exhaust gas that is flowing within the exhaust gas passageway 60 for circulation through the EGR system 70.

In the illustrated embodiment, the EGR passageway 72 draws in exhaust gas from the exhaust gas passageway 60 at a location upstream from the exhaust throttle valve 61. The EGR cooler 74 is disposed in-line with the EGR passageway 72 for the purpose of cooling the exhaust gas flowing through the EGR passageway 72 and may be upstream of the EGR pump 76 (as shown in FIG. 2) or downstream of the EGR pump 76. The EGR pump 76 has an inlet side 79 in fluid communication with the exhaust manifold 28 and an outlet side 81 in fluid communication with the intake manifold 26. In one embodiment, the EGR pump 76 is constructed as a roots style pump having rotors 82 driven by an electric motor 84. The EGR pump 76 may be electrically controlled to selectively control the flow of exhaust gas recirculated from the exhaust gas passageway 60 to the engine 20 via the EGR passageway 72.

The EGR pump 76 is configured as a reversible pump that is operable in two different modes—a forward mode and a reverse mode—with the EGR pump 76 being electrically controlled to selectively control the mode of operation thereof. In the forward mode, the EGR pump 76 operates to recirculate a portion of the exhaust gas from the exhaust gas passageway 60 into the intake manifold 26. In the reverse mode, the EGR pump 76 operates in reverse from the forward mode to prevent leakage of exhaust gas therethrough, as may occur if the EGR pump 76 were simply turned off when not operating in the forward mode. When operating in the reverse mode, the speed of the EGR pump 76 may be controlled to determine a flow output therefrom, with the EGR pump operable at a speed that substantially prevents flow of exhaust gas therethrough (i.e., a zero flow) or at a speed that provides a non-exhaust air (i.e., fresh air) flow therethrough in an opposite direction from that of the exhaust gas flow.

Figure 3:
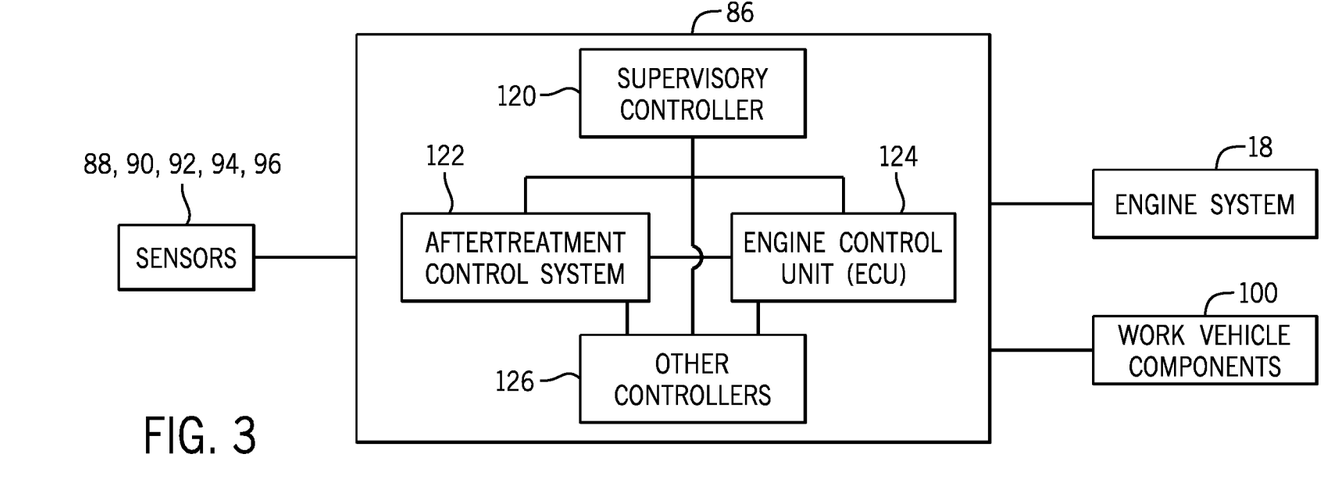
FIG. 3 is a block diagram of a control system of the engine system of FIG. 2.

Referring to FIGS. 2 and 3, the engine system includes a control system 86 and various sensors including: an engine speed sensor 88; one or more sensor(s) 90 disposed in the intake manifold 26 or the air intake passageway 50 that measure any or more of mass airflow, air temperature, and air pressure in the air intake manifold 26 and/or air intake passageway 50; one or more sensor(s) 92 in the exhaust manifold 56 that may measure any or all of an oxygen level, temperature, and pressure of exhaust generated by the engine 20; one or more aftertreatment sensors 94 that determine the condition of the aftertreatment system 64 including an amount of soot trapped in a DPF device and or an amount of sulfur or other contaminant accumulated in the SCR catalyst 66; and a catalyst temperature sensor 96 that produces a signal and/or data in accordance with a temperature of the SCR catalyst 66.

The control system 86 monitors signals or data received from the sensors 88, 90, 92, 94, and 96 described above and adjusts operation of the engine system 18 and other components 100 such as an operator interface, climate control, traction control, lifting devices, and the like, to ensure the work vehicle 10 is able to meet the demands placed on work vehicle 10 by an operator while managing fuel efficiency and reduction of hazardous exhaust gases released into the ambient environment. In particular, the control system 86 includes a supervisory controller 120, an aftertreatment system controller 122 that optimizes operation of the aftertreatment system 64 to convert exhaust gases by the engine 20 into more inert gases that may be exhausted through the exhaust outlet 65, and an engine control unit (ECU) 124 that optimizes operation of the engine 20. The control system 86 may also include one or more additional controller(s) 126 such as an operator interface controller, a climate control system, a traction system controller, an accessory and/or hydraulic system controller, and various others.

The supervisory controller 120 initiates the aftertreatment system controller 122, the ECU 124, and the other controllers 126 when the work vehicle 10 is started by the operator (e.g., when the operator of the work vehicle 10 actuates an ignition of the vehicle 10), monitors operation of such controllers during operation of the vehicle 10, and shuts down such controllers when the work vehicle 10 is turned off. The supervisory controller 120, aftertreatment system controller 122, the ECU 124, and the other controllers 126 exchange signals and/or data therebetween as necessary to maintain efficient and clean operation of the engine system 18 (and thereby the work vehicle 10).

Figure 3A:
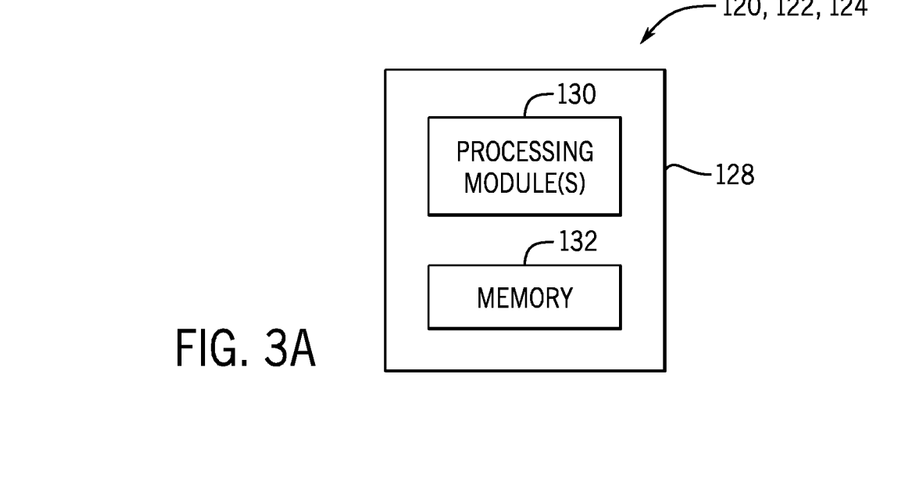
FIG. 3A is a block diagram of a computer-based device that may implement the components of the control system of FIG. 3.

Referring also to FIG. 3A, the supervisory controller 120, the aftertreatment system controller 122, the ECU 124, and other controllers 126 may be implemented using hardware, software, firmware, or combinations thereof. In the illustrated embodiment, such components 120, 122, 124, and 126 of the control system 86 may be implemented by one or more suitably programmed computer-based device(s) 128, some or each having a processing module 130 and a memory 132. The memory 132 has stored therein, among other things, programming instructions executed by one or more processing modules 130 to cause the components 120, 122, 124, and 126 to undertake functions of the engine system 18 as described herein.

Each computer-based device 128 may comprise, e.g., computer, a device using one or more application specific integrated circuits (ASIC's) and/or field-programmable gate arrays (FPGA's), and/or combinations thereof. Such device 128 may be unitary or may be distributed multiple computing devices, and one or more such computing devices may be installed locally on or remote from the work vehicle 10. Each computing device 128 may communicate with another computing device over one or more network(s) such as a local area network (LAN), a control area network (CAN), a cellular network, a wide area network (WAN) such as the Internet, and the like. One or more components 120, 122, 124, and 126 of the control system 86 may be also coupled to and responsive to one or more user device(s) (not shown) such as a keyboard, a mouse, a display, a touchscreen, a joystick, etc. (not shown) via which an operator may monitor and direct operation of the work vehicle 10.

Referring once again to FIG. 2, the SCR catalyst 66 of the aftertreatment system 64 may be composed of suitable catalyzing materials, such as platinum, palladium, rhodium, iridium, ceramics, and combinations thereof. Various reductants may be used in conjunction with the SCR catalyst, including known nitrogen-bearing reductants such as anhydrous ammonia, aqueous ammonia, and urea. Upon activation by heat, the catalyst facilitates a reaction among the hydrocarbon and NOx components of the exhaust gases generated by the engine 20 and passed through or past the SCR catalyst 66 to breakdown at least some of these components into gases into water vapor, carbon dioxide, and nitrogen that are exhausted from the exhaust outlet 65.

Figure 4:
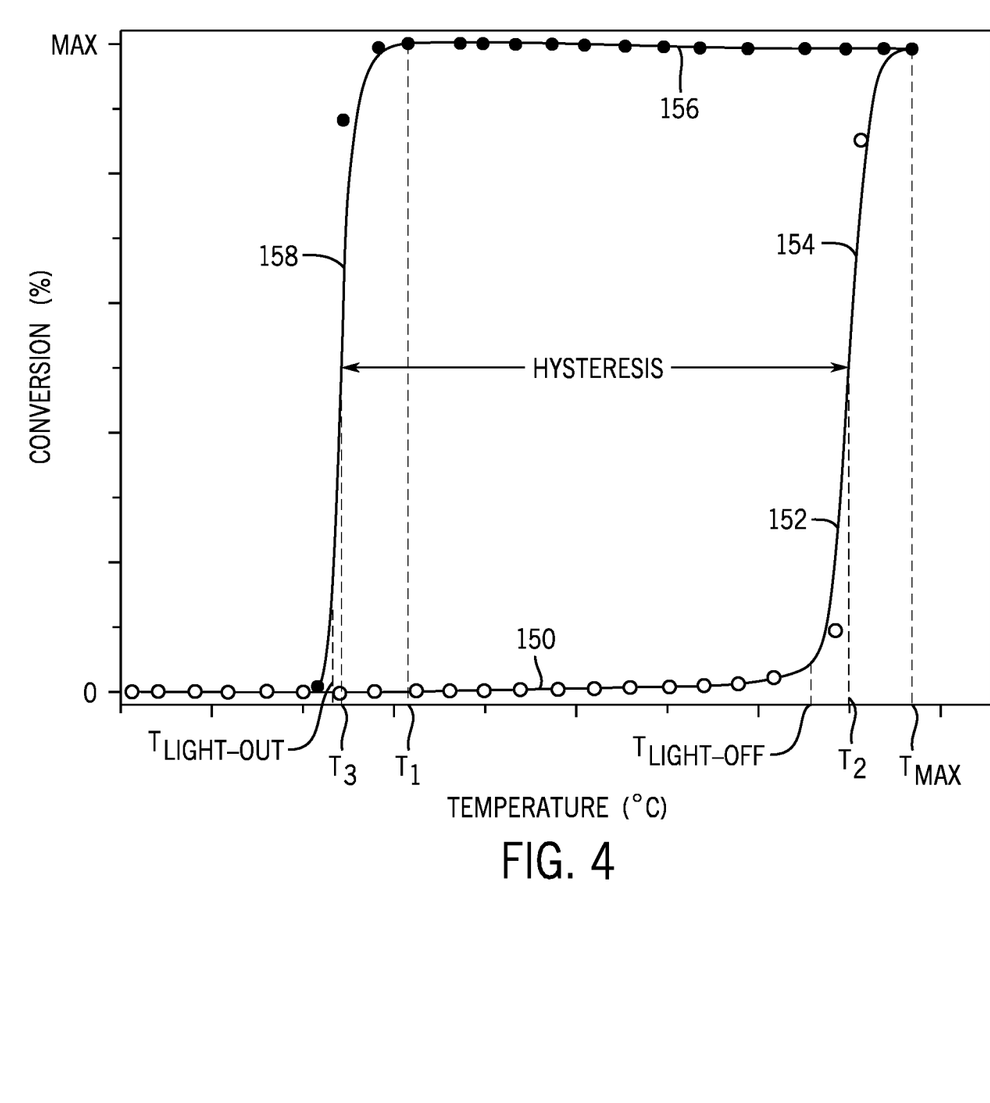
FIG. 4 is a graph that shows the efficacy of an example catalyst in converting exhaust gases over a range of temperatures.

The SCR catalyst 66 has a particular conversion profile over a range of temperatures at which a portion of the exhaust gases is converted, such as the example profile shown in FIG. 4. Initially, the SCR catalyst 66 is substantially inactive and there is little conversion of exhaust gas while the temperature of the SCR catalyst is below a temperature $T_{light\text{-}off}$ (as shown by a first portion 150 of the curve 152). After the temperature of the catalyst reaches the temperature $T_{light\text{-}off}$, the catalyst is activated and the portion of the exhaust gases converted as the gases pass through the SCR catalyst 66 increases rapidly (such as exponentially or asymptotically), as shown by a second portion 154 of the curve 152, as the temperature is increased and continues to increase until the temperature of the SCR catalyst 66 reaches at least a temperature $T_{max}$. At the temperature $T_{max}$ and higher, the SCR catalyst 66 facilitates conversion of a maximum portion of the exhaust gases the passing through the SCR catalyst 66. In some cases, the maximum portion of the exhaust gases converted is more than about 90%. In other cases, such maximum portion is at least approximately 95%, and in still other cases the portion is substantially 100%. If the temperature of the SCR catalyst 66 is raised above $T_{max}$, the portion of the gases converted by the SCR catalyst 66 does not increase substantially. Thus, it is not necessary to operate the engine system 18 to raise the temperature of the SCR catalyst 66 beyond $T_{max}$ except possibly temporarily to burn off buildup of soot and contaminants on the SCR catalyst as would be understood by one who has ordinary skill in the art.

Further, once the temperature of the SCR catalyst 66 has reached the temperature $T_{max}$, the SCR catalyst continues to be activated through hysteresis and facilitates the chemical reactions that convert a maximum portion of the active exhaust gases passed therethrough even as the temperature of the SCR catalyst 66 falls (as shown by a portion 156 of the curve 150). The SCR catalyst 66 remains activated as a result of the hysteresis until the temperature of the SCR catalyst 66 reaches a predetermined temperature $T_1$ (as shown by the portion 156 of the curve 150). If the temperature of the SCR catalyst 66 falls below the temperature $T_1$, the portion of the exhaust gases converted by the SCR catalyst 66 falls rapidly as the temperature of the SCR catalyst 66 decreases until the temperature of the SCR catalyst 66 reaches a predetermined temperature $T_{light-out}$ (as shown by the portion 158 of the curve 150). Substantially little or no conversion of the exhaust gases occurs as such gases pass through the SCR catalyst 66 when the temperature of the catalyst is at or below the temperature $T_{light-out}$ or below. Thus, once the catalyst is heated to the temperature $T_{max}$, additional thermal energy does not need to be supplied to the catalyst to maintain activation of the catalyst until the temperature of the catalyst falls below the temperature $T_1$. In some embodiments if the catalyst is heated to a particular temperature that is at least $T_{light-off}$ but less than $T_{max}$, then the SCR catalyst 66 sustains conversion of exhaust gases at a conversion rate associated with such particular temperature until the temperature of the SCR catalyst 66 falls below the temperature $T_1$.

Figure 5:
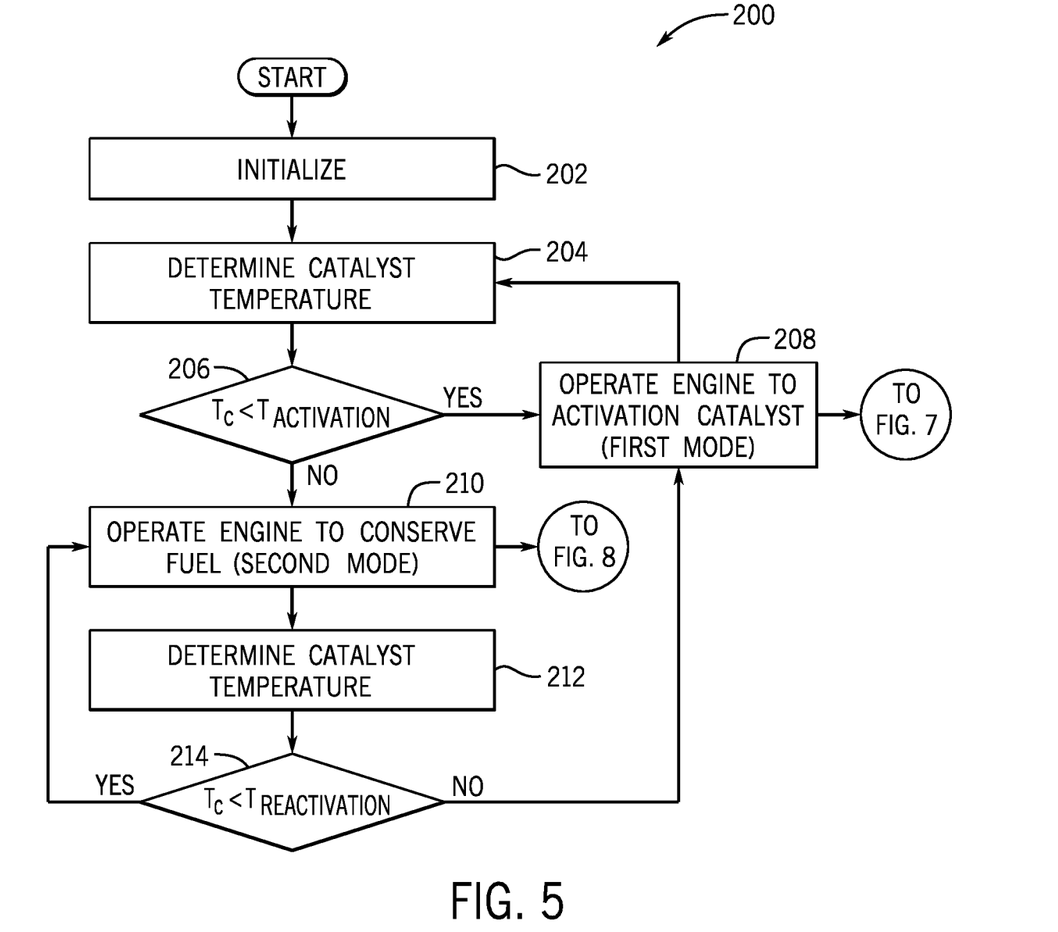
FIG. 5 is a flowchart of processing undertaken by an embodiment of an aftertreatment system controller of the control system of FIG. 3.

Referring also to FIG. 5, as described in greater detail below, the disclosed aftertreatment system takes advantage of the above-noted hysteresis effect to conserve fuel. In particular, the aftertreatment system controller 122 monitors the temperature signal or data generated by the temperature sensor 96 during operation of the engine system 18 and causes the engine system 18 to operate in a first (activation) mode that generates sufficient power to both operate the work vehicle 10 and additional power to heat the catalyst to a first temperature threshold $T_{activation}$. Such first temperature threshold $T_{activation}$ may be, for example, $T_{light-off}$, $T_{max}$, or a temperature $T_2$ between $T_{light-off}$ and $T_{max}$. Thereafter, the aftertreatment system controller 122 causes the engine system 18 to operate in a second (fuel conservation) mode in which the engine system 18 is operated to meet the power requirements of the work operations of the work vehicle 10 without any additional power to heat the SCR catalyst 66. It should be apparent to one who has ordinary skill in the art that operating the engine system 18 in the second mode reduces the fuel consumption of the engine system 18 while converting the maximum portion of the exhaust gases passing through the SCR catalyst 66. The aftertreatment system controller 122 continues to monitor the temperature of the SCR catalyst 66 and if such temperature falls below a second temperature $T_{reactivation}$, the aftertreatment system controller 122 causes the engine system 18 to operate in the first mode once again until the temperature of the SCR catalyst 66 reaches at least the first temperature threshold $T_{activation}$. The second temperature $T_{reactivation}$ may be $T_1$, $T_{light-out}$, or a temperature between $T_1$ and $T_{light-out}$.

In some embodiments, the temperatures $T_{light-out}$ and $T_{light-off}$ are approximately 10 degrees Celsius and 100 degrees Celsius, respectively. In some cases, the band of temperatures in which the SCR catalyst 66 sustains conversion of the exhaust gases due to hysteresis spans approximately 100 degrees Celsius. However, one who has ordinary skill in the art would understand that the temperatures $T_{light-out}$ and $T_{light-off}$ and the range of temperatures spanned by the band in which the SCR catalyst 66 remains active due to hysteresis may vary depending on the materials selected for the SCR catalyst 66. In some embodiments, the temperature $T_{reactivation}$ is selected so that the temperature of the SCR catalyst 66 is maintained within a temperature range that is between approximately 10% and approximately 20% of the temperatures spanned by such band. For example, if the band of temperatures at which the SCR catalyst 66 sustains conversion of exhaust gases spans 100 degrees Celsius, then the temperature $T_{reactivation}$ is selected to be a temperature that is between 10 degrees Celsius and 20 degrees Celsius above the bottom end of such band.

The supervisory controller 120 initiates operation of the aftertreatment system controller 122 when the engine system 18 is started. At step 202, the aftertreatment system controller 122 begins an initialization process that includes, for example, loading from the memory 132 a type and location of the temperature sensor 96, components (e.g., the catalyst heater 68) installed in the engine system 18 that May be used to heat the SCR catalyst 66, the material that comprises in the SCR catalyst installed in the vehicle 10, and values of the temperatures $T_{light-out}$, $T_{max}$, $T_{light-off}$, $T_1$, $T_2$, and $T_3$ and associated with the installed SCR catalyst 66. The aftertreatment system controller 122 also initializes the temperature sensor 96, if necessary, and establishes communication with the ECU 124 and other controllers of the control system 86. The aftertreatment system controller 122 uses such data loaded from the memory 132 to determine a first temperature threshold $T_{activation}$ and a second temperature threshold $T_{reactivation}$ described above.

The aftertreatment system controller 122 uses the type and location of the temperature sensor 96 loaded from the memory 132 to determine how signals and/or data generated by the temperature sensor 96 should be interpreted. For example, if the temperature sensor 96 is disposed in the aftertreatment system 64 to directly monitor the temperature of the SCR catalyst 66, the signal and/or data may be interpreted as providing the actual temperature of the SCR catalyst 66. However, if the temperature sensor 96 is disposed to sense a temperature of the housing 69 of the aftertreatment system 64, in the aftertreatment passageway 62, or the exhaust outlet 65, an offset may need to be applied to the temperature sensed by the temperature sensor 96 to develop an estimate of the temperature of the SCR catalyst 66. For example, if the temperature sensor is disposed to sense the temperature of the housing 69, such offset may be used to compensate for any insulating materials between the SCR catalyst 66 and the housing 69 that would cause the sensed temperature to be less than the temperature of the SCR catalyst 66. Similarly, if the temperature sensor is disposed in the aftertreatment passageway 62 or exhaust outlet 65, the offset May be used to compensate for any cooling of the gases that may occur as the exhaust gases pass through such passageway 62 into the aftertreatment system 64 or outlet 65 out of the aftertreatment system 64.

In some embodiments, the aftertreatment system controller 122 polls the temperature sensor 96 when the aftertreatment system controller 122 needs to determine the temperature of the SCR catalyst 66. In other embodiments, the temperature sensor 96 is programmable to generate a signal and/or data when a particular temperature is sensed thereby. After the above-noted initialization steps are completed, the aftertreatment system controller 122, at step 204, determines the temperature of the SCR catalyst 66. In particular, the aftertreatment system controller 122 polls the temperature sensor 96 to determine the temperature sensed thereby and applies any temperature offsets (as described above) to develop an estimate of the temperature of the SCR catalyst 66. At step 206, the aftertreatment system controller 122 determines if the temperature (Tc) of the SCR catalyst 66 determined at step 204 is less than the first temperature threshold $T_{activation}$ and, if so, proceeds to step 208. Otherwise, the aftertreatment system controller proceeds to step 210.

At step 208, the aftertreatment system controller 122 causes the engine to operate in a first mode to activate the SCR catalyst 66 as described in greater detail below and returns to step 204. The aftertreatment system controller 122 loops through steps 204, 208, and 208 until the SCR catalyst 66 temperature reaches at least the first temperature threshold $T_{activation}$, after which the aftertreatment system controller 122 proceeds to step 210. At step 210, the aftertreatment system controller 122 causes the engine to operate in a second mode to optimize efficiency of the work vehicle in which the engine system operates to supply sufficient power to operate the work vehicle 10 as directed by the operator thereof without generating additional power to heat the SCR catalyst 66. After step 210, the aftertreatment system controller 122, at step 212 determines the temperature of the SCR catalyst 66. Step 212 is substantially identical to step 204.

Thereafter, at step 214, the aftertreatment system controller 122 determines if the temperature Tc of the SCR catalyst 66 determined at step 212 is at least the second temperature threshold $T_{reactivation}$ and if so proceeds to step 210 to continue to operate the engine system 18 in the second mode. The aftertreatment system controller 122 loops through steps 210, 212, and 214 in this manner and operates the engine system 18 in the second mode as long as the temperature of the SCR catalyst 66 is at least the second temperature threshold $T_{reactivation}$ (i.e., in a temperature band between the first and second temperature thresholds $T_{activation}$, $T_{reactivation}$) and the SCR catalyst 66 is able to sustain conversion of the exhaust gases passing through the SCR catalyst 66 because of the hysteresis effect described above. If the aftertreatment system controller 122 determines the temperature of the SCR catalyst 66 has fallen below the second temperature threshold $T_{reactivation}$ at step 214, the aftertreatment system controller 122 proceeds to step 208 to cause the engine system 18 to operate in the first mode once again and thereby reactivate the SCR catalyst 66. The aftertreatment system controller 122 undertakes steps 202-214 until operation of the aftertreatment system controller 122 is terminated by the supervisory controller 120 (e.g., when the operator turns off the vehicle 10).

In some embodiments, the temperature sensor 96 may be programmable to generate a signal and/or data when the temperature sensed thereby is greater than or less than one or more particular temperature setpoints instead of having to be polled.

Figure 6:
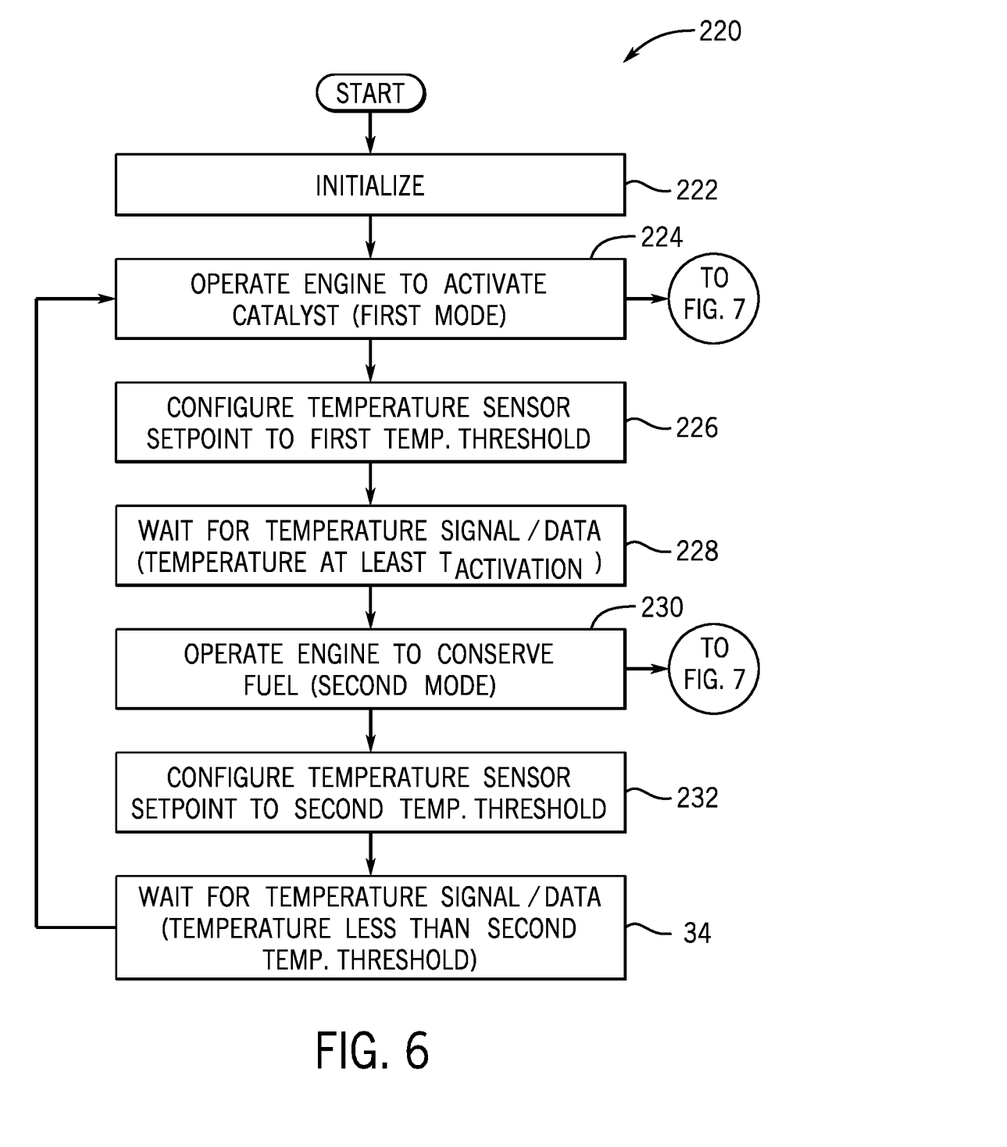
FIG. 6 is a flowchart of processing undertaken by another embodiment of an aftertreatment system controller of the control system of FIG. 3.

FIG. 6 is a flowchart 220 of another embodiment of the aftertreatment system controller 122 that may be utilized with a temperature sensor 96 that is programmable. Upon being started by the supervisory controller 120, the aftertreatment system controller 122, at step 222, undertakes an initialization step substantially identical to that described above in connection with step 202 of flowchart 200 (FIG. 5). Thereafter, at step 224 (substantially identical to FIG. 5, step 208), the aftertreatment system controller 122 causes the engine system 18 to operate in the first mode to generate additional power necessary to rapidly heat the SCR catalyst 66 and then proceeds to step 226.

At step 226, the aftertreatment system controller 122 configures the temperatures sensor 96 to generate a signal and/or data when a temperature sensed thereby indicates the temperature of the SCR catalyst 66 is at least the first temperature threshold $T_{activation}$. Note that the aftertreatment system controller 122 configures the temperature sensor 96 to generate the signal and/or data when a temperature sensed thereby is a temperature that is the first temperature threshold $T_{activation}$ with any offsets determined at step 222 added thereto or subtracted therefrom.

At step 228, the aftertreatment system controller 122 waits for a signal and/or data generated by the temperature sensor 96 that indicates the temperature of the SCR catalyst 66 is at least the first temperature threshold $T_{activation}$. At step 230 (substantially identical to FIG. 5, step 210), the aftertreatment system controller 122 causes the engine to operate in the second mode. Thereafter, at step 232, the aftertreatment system controller 122 configures the temperature sensor to generate a signal and/or data when a temperature sensed thereby indicates the temperature of the SCR catalyst 66 is the second temperature threshold $T_{reactivation}$ or less.

Thereafter, at step 234, the aftertreatment system controller 122 waits for temperature sensor 96 to generate the signal and/or data that the temperature of the SCR catalyst 66 is at or below the second temperature threshold $T_{reactivation}$ and thus outside the temperature band in which the SCR catalyst 66 is able sustain conversion of exhaust gases due to hysteresis. Thereafter, the aftertreatment system controller returns to step 224 so that the engine system 18 generates sufficient power to heat and thereby reactivate the SCR catalyst 66. The aftertreatment system controller loops through steps 224-234 until the operation of the aftertreatment system 13 controller 122 is stopped by the supervisory controller 120.

Figure 7:
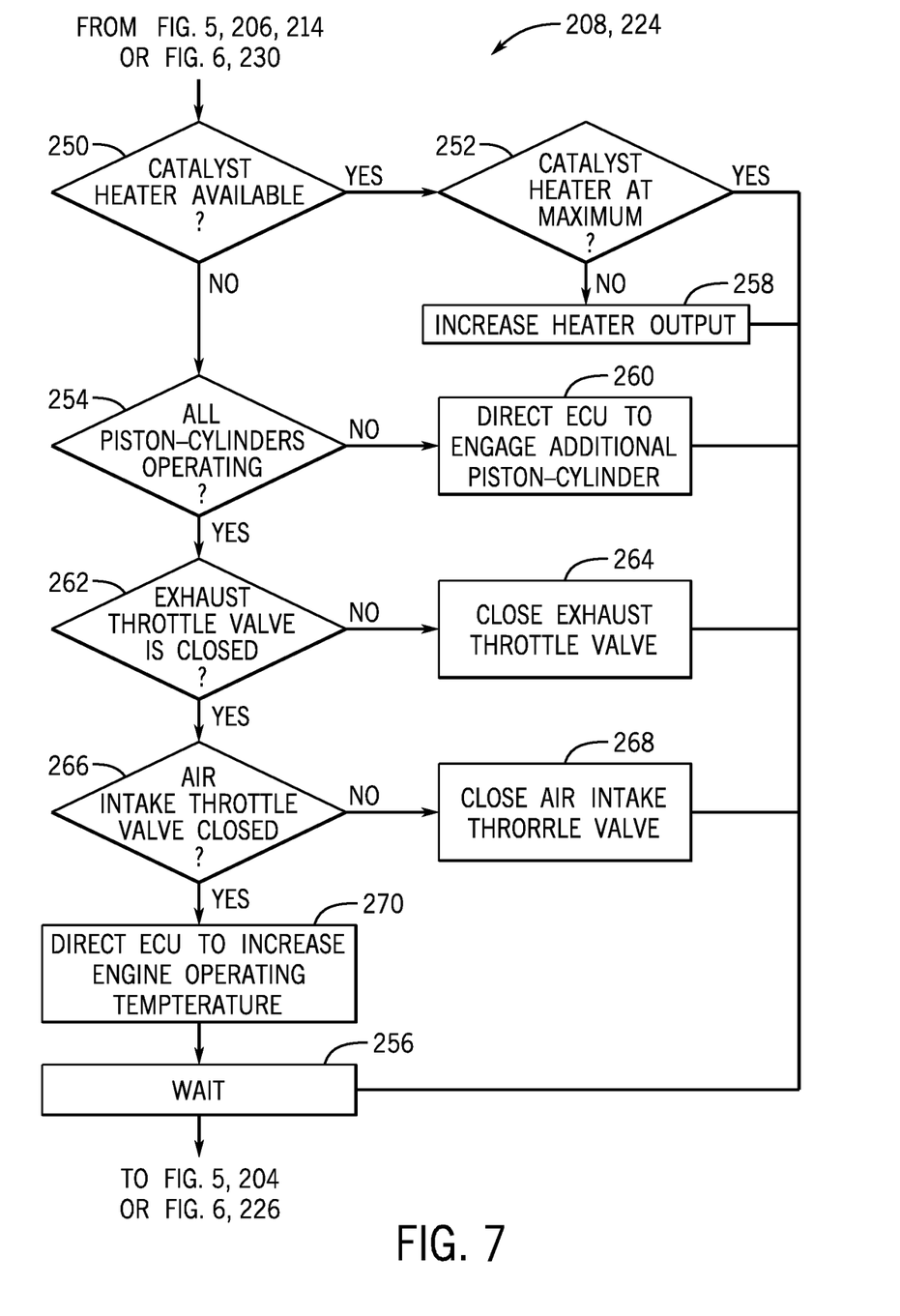
FIG. 7 is a flowchart of processing undertaken by the aftertreatment system controller of FIG. 5 or 6 to operate the engine system of FIG. 2 in a first mode.

FIG. 7 shows a flowchart of the steps undertaken by the aftertreatment system controller 122 to operate the engine system 18 in the first mode at step 208 (FIG. 5) or step 224 (FIG. 6). At step 250, the aftertreatment system controller 122 checks the information loaded from the memory 132 during initialization at step 202 (FIG. 5) or step 222 (FIG. 6) to determine if the heater 68 is installed in the engine system 18 and if so proceeds to step 252. Otherwise, the aftertreatment system controller proceeds to step 254.

At step 252, the aftertreatment system controller 122 checks if the catalyst heater 68 is operating and set at a maximum setting thereof. If the catalyst heater 68 is operating at such maximum setting the aftertreatment system controller 122 proceeds to step 256. Otherwise, the aftertreatment system controller 122 adjusts the setting of the catalyst heater 68 to increase the thermal output thereof at step 258. Typically, operation of the engine 20 generates and supplies power required by the catalyst heater 68, and thus increasing the thermal output of the heater increases the load on the engine 20. After step 258, the aftertreatment system controller 122 proceeds to step 256.

At step 254, the aftertreatment system controller 122 determines if all of the piston-cylinder arrangements 24 of the engine 20 have been engaged and are operating (e.g., by querying the ECU 124). If all of the piston-cylinder arrangements 24 are not engaged and operating, the aftertreatment system controller 122, at step 260, directs the ECU 124 to engage and actuate one or more additional piston-cylinder arrangement(s) 24, and then proceeds to step 256.

However, if at step 254, the aftertreatment system controller 122 determines that all of the piston-cylinder arrangements 24 are engaged and operating, the aftertreatment system controller 122, at step 262, determines if the exhaust throttle valve 61 is closed. The exhaust throttle valve 61 is considered closed if such valve is at a position that allows only a predetermined minimum flow of exhaust gases therethrough into the aftertreatment passageway 62 necessary to keep the engine 20 safely operating. If the exhaust throttle valve 61 is not closed, then, at step 264, the aftertreatment system controller 122 operates an exhaust throttle valve actuator (not shown) to close the exhaust throttle valve 61 by a predetermined amount. Such predetermined amount is selected to ensure that the exhaust throttle valve 61 allows at least the minimum flow of exhaust gases therethrough. It should be apparent to one who has ordinary skill in the art that closing the exhaust throttle valve 61 increases the back pressure of the exhaust gases in the exhaust gas passageway 60 and thereby increases the temperature of the exhaust gases that pass through the exhaust throttle valve 61 and into the aftertreatment passageway 62. After causing the exhaust throttle valve 61 to close at step 264, the aftertreatment system controller 122 proceeds to step 256.

If at step 262, the aftertreatment system controller 122 determines that the exhaust throttle valve 61 is closed, then the aftertreatment system controller 122 determines if the air intake throttle valve 52 is closed at step 266. The air intake throttle valve 52 is considered closed if such valve is at a position that allows only a predetermined minimum flow of air into the air intake manifold 42 (and thus the engine) to keep the engine 20 operating. If the air intake throttle valve is closed, the aftertreatment system controller 122 proceeds to step 270.

Otherwise, at step 268 the aftertreatment system controller 122 actuates an air intake throttle valve actuator (not shown) to close the air intake throttle valve 52 and thereby reduce the flow of air into the air intake manifold 42. Reducing such flow of air increases the proportion of fuel in the air-fuel mixture introduced into the piston-cylinder arrangements 24 and increases the operating temperature of the engine 20. As a result, the temperature of the exhaust gases generated by the engine 20 is also increased. In some embodiments, the ECU 124 controls opening and closing of the air intake throttle valve 52 and the aftertreatment system controller 122 directs the ECU 124 to close the air intake throttle valve 52 at step 268. The ECU 124 may override such direction if the ECU 124 determines that closing the air intake throttle valve 52 would not be safe or otherwise warranted for operation of the engine 20. After causing the air intake throttle valve 52 to close or directing the ECU 124 to close such valve, the aftertreatment system controller 122 proceeds to step 256.

At step 270, the aftertreatment system controller 122 directs the ECU 124 to operate the engine 20 at a higher temperature. In response, the ECU 124 adjusts the air-fuel mixture supplied to the engine to increase the operating temperature of the engine 20 or undertakes other measures necessary to increase the temperature of the exhaust gases produced by the engine 20. In some embodiments, the ECU 124 supplies a stochiometric air-fuel ratio to maximize the amount of fuel combusted in piston-cylinder arrangements 24 of the engine 20 and thereby generate exhaust having a higher temperature.

As would be understood by one having ordinary skill in the art, stochiometric operation of a spark-ignited engine (e.g., an ethanol or natural gas combusting engine), is not necessarily used to generate heat but to create a zero excess oxygen condition in the exhaust gases generated by the engine, which allows maximum performance for a three-way catalyst used with such engines. However, fuel efficiency may be improved if such catalyst is able to sustain conversion of exhaust gases because of hysteresis even when such engine is run lean.

At step 256, the aftertreatment system controller 122 waits at least a predetermined amount of time to allow the actions undertaken at steps 258, 260, 264, 268, or 270 to result in an increase in the temperature of the SCR catalyst 66. After step 256, the aftertreatment system controller 122 returns to steps 204 (FIG. 5) or step (FIG. 6).

Figure 8:
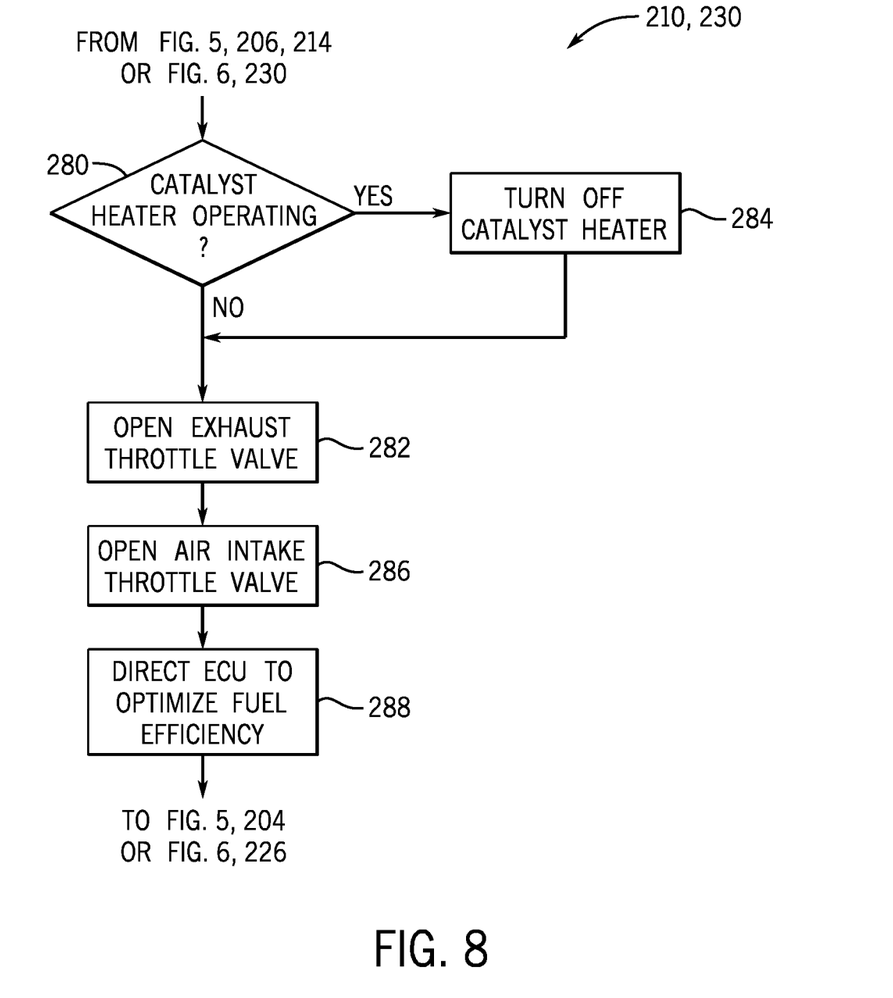
FIG. 8 is a flowchart of processing undertaken by the aftertreatment system controller of FIG. 5 or 6 to operate the engine system of FIG. 2 in a second mode.

FIG. 8 shows a flowchart of the steps undertaken by the aftertreatment system controller 122 to operate the engine system 18 in the second mode at step 210 (FIG. 5) or step 230 (FIG. 6). At step 280, the aftertreatment system controller 122 determines if the catalyst heater 68 is installed and operating. If the catalyst heater 68 is not installed or not operating, the aftertreatment system controller 122 proceeds to step 282. Otherwise, the aftertreatment system controller 122, at step 284, turns off the catalyst heater 68 and proceeds to step 282.

At step 282 the aftertreatment system controller 122 operates the exhaust throttle valve actuator (not shown) to open the exhaust throttle valve 61 if such valve is closed. Thereafter, at step 286, the aftertreatment system controller 122 operates the air intake throttle valve actuator (not shown) to open the air intake throttle valve 52 if such valve is closed.

After the catalyst heater 68 (if installed) is turned off and the exhaust throttle valve 61 and the air intake throttle valve 52 are opened, the aftertreatment system controller 122, at step 288, directs the ECU 124 to operate the engine system 18 to provide sufficient power to operate the vehicle 10 as directed by the operator while maximizing fuel efficiency. In response to ECU 124 may disengage one or more piston-cylinder arrangements 24, adjust the air-fuel mixture supplied to the piston-cylinder arrangements 24 of the engine 20 to be leaner to reduce the amount of fuel combusted therein, and the like. Thereafter, the aftertreatment system controller 122 proceeds to step 204 (FIG. 5) or step 226 (FIG. 6).

Although the embodiments disclosed herein are described in connection with a vehicle having a diesel engine system and a SCR catalyst, it should be apparent to one who has ordinary skill in the art that aspects of these embodiments may be adapted to other types of work vehicles having other types of engines and catalysts to sustain conversion exhaust gases generated by such engine system through hysteresis to optimize the efficiency of the engine system. Further, aspects of such embodiments may even be used in other types of engines or motors not associated with vehicles as appropriate.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A control system for a work vehicle engine system with an engine from which exhaust gas flows, at least in part, to an aftertreatment selective catalytic reduction (SCR) catalyst, the control system comprising:
   a temperature sensor providing an indication of a catalyst temperature associated with the SCR catalyst; and
   a controller having processing and memory architecture configured to receive a control signal from the temperature sensor indicative of the catalyst temperature and execute instructions according to the control signal to:
      activate a conversion of exhaust gas by the SCR catalyst by operating the engine system in a first mode that drives the SCR catalyst temperature to a first temperature threshold; and
      after reaching the first temperature threshold, reduce power to the SCR catalyst by operating the engine system in a second mode in which the conversion of the exhaust gas by the SCR catalyst is sustained by hysteresis within a temperature band between the first temperature threshold and a second temperature threshold that is less than the first temperature threshold.

2. The control system of claim 1, wherein the control system operates the engine system to put a first power demand on the engine during the first mode and a second power demand that is less than the first mode during the second mode.

3. The control system of claim 2, further including a control valve operable to throttle flow upstream or downstream of the engine;
   wherein, in the first mode, the controller operates the control valve to a first throttle position and, in the second mode, to a second throttle position, wherein in the first throttle position the control valve closes off more flow than in second throttle position.

4. The control system of claim 3, wherein the control valve is an exhaust throttle valve which is positioned in an exhaust path between the engine and the aftertreatment SCR catalyst.

5. The control system of claim 3, wherein the control valve is an intake valve located upstream of an intake manifold of the engine.

6. The control system of claim 2, further including an electric heater powered by the engine;
   wherein, in the first mode, the controller operates the electric heater to supplement the engine to raise the SCR catalyst to the first temperature threshold.

7. The control system of claim 1, further including an engine control unit that controls operation of the engine.

8. The control system of claim 7, wherein the engine control unit controls an air-fuel mixture of the engine prior to combustion;
   wherein, in the first mode, the engine control unit effects a stoichiometric air-fuel ratio; and
   wherein, in the second mode, the engine control unit effects a lean air-fuel ratio.

9. The control system of claim 7, wherein the engine includes a plurality of piston-cylinder arrangements; and
   wherein, in the second mode of operation, the engine control unit deactivates one or more of the plurality of piston-cylinder arrangements.

10. The control system of claim 1, wherein the first temperature threshold corresponds to a light-off temperature at which the SCR catalyst effects a reduction reaction of nitrogen oxides and the second temperature threshold corresponds to a temperature at which the reduction reaction of nitrogen oxides is terminated.

11. The control system of claim 10, wherein the temperature band between the first temperature threshold and the second temperature threshold in which the reduction reaction of the nitrogen oxides is sustained by hysteresis within the SCR catalyst is at least 25 degrees Celsius.

12. An engine system for a work vehicle comprising:
   an engine with a piston-cylinder arrangement and an exhaust manifold;
   an aftertreatment system in communication with the exhaust manifold and including a selective catalytic reduction (SCR) catalyst;
   a temperature sensor providing an indication of a catalyst temperature associated with the SCR catalyst; and
   a control system having processing and memory architecture configured to receive a control signal from the temperature sensor indicative of the catalyst temperature and execute instructions according to the control signal to:
      activate a conversion of exhaust gas by the SCR catalyst by operating the engine system in a first mode that drives the SCR catalyst temperature to a first temperature threshold; and
      after reaching the first temperature threshold, reduce power to the SCR catalyst by operating the engine system in a second mode in which the conversion of the exhaust gas by the SCR catalyst is sustained by hysteresis within a temperature band between the first temperature threshold and a second temperature threshold that is less than the first temperature threshold.

13. The engine system of claim 12, wherein the control system operates the engine system to put a first power demand on the engine during the first mode and a second power demand that is less than the first mode during the second mode.

14. The engine system of claim 13, further including a control valve operable to throttle flow upstream or downstream of the engine;
   wherein, in the first mode, the controller operates the control valve to a first throttle position and, in the second mode, to a second throttle position, wherein in the first throttle position the control valve closes off more flow than in second throttle position.

15. The engine system of claim 14, wherein the control valve is an exhaust throttle valve which is positioned in the exhaust path between the engine and the aftertreatment system.

16. The engine system of claim 14, wherein the control valve is an intake valve located upstream of an intake manifold of the engine.

17. The engine system of claim 13, further including an electric heater powered by the engine;

wherein, in the first mode, the controller operates the electric heater to supplement the engine to raise the SCR catalyst to the first temperature threshold.

18. The engine system of claim 12, wherein the controller includes an engine control unit that controls an air-fuel mixture of the engine prior to combustion;

wherein, in the first mode, the engine control unit effects a stoichiometric air-fuel ratio; and wherein, in the second mode, the engine control unit effects a lean air-fuel ratio.

19. The engine system of claim 12, wherein the controller includes an engine control unit that controls operation of the engine and the engine includes a plurality of piston-cylinder arrangements; and wherein, in the second mode of operation, the engine control unit deactivates one or more of the plurality of piston-cylinder arrangements.

20. The engine system of claim 12, wherein the first temperature threshold corresponds to a light-off temperature at which the SCR catalyst effects a reduction reaction of nitrogen oxides in the exhaust gas;

wherein the second temperature threshold corresponds to a light-out temperature in which the reduction reaction of nitrogen oxides is terminated; and wherein the temperature band between the first temperature threshold and the second temperature threshold in which the reduction reaction of nitrogen oxides is sustained by hysteresis within the SCR catalyst is at least 25 degrees Celsius.

* * * * *